United States Patent [19]

Hiestand

[11] Patent Number: 4,754,673
[45] Date of Patent: Jul. 5, 1988

[54] SELF-CENTERING STEADY REST FOR LATHE

[75] Inventor: Karl Hiestand, Pfullendorf, Fed. Rep. of Germany

[73] Assignee: SMW Schneider & Weisshaupt GmbH, Fed. Rep. of Germany

[21] Appl. No.: 942,538

[22] Filed: Dec. 16, 1986

[30] Foreign Application Priority Data

Dec. 19, 1985 [DE]  Fed. Rep. of Germany ....... 3544961

[51] Int. Cl.⁴ ............................................. B23B 25/00
[52] U.S. Cl. ....................................... 82/39; 82/38 R
[58] Field of Search ............... 82/38 R, 39; 51/238 R, 51/238 S

[56] References Cited

U.S. PATENT DOCUMENTS

| | | | |
|---|---|---|---|
| 3,535,963 | 10/1970 | Dietl | 82/38 R |
| 3,736,114 | 5/1973 | Okada | 82/38 R |
| 4,463,635 | 8/1984 | Hafla | 82/38 R |
| 4,517,866 | 5/1985 | Bazuin | 82/39 |

FOREIGN PATENT DOCUMENTS

| | | | |
|---|---|---|---|
| 0056287 | 5/1890 | Fed. Rep. of Germany | 82/39 |
| 3303041 | 2/1954 | Fed. Rep. of Germany | 82/38 R |
| 2163257 | 7/1972 | Fed. Rep. of Germany | 82/38 R |
| 3314483 | 3/1984 | Fed. Rep. of Germany | 82/38 R |

Primary Examiner—Frederick R. Schmidt
Assistant Examiner—Blynn Shideler
Attorney, Agent, or Firm—McGlew and Tuttle

[57] ABSTRACT

In a self-centering steady rest (1) with three holding members (12,13,14) acting upon a workpiece (2) to be chucked, an adjusting member (15) interacting with the two outer holding members (13,14) is adjustable in the longitudinal direction (A) of the central holding member (12) by an adjustable distance corresponding to the sum of respective deformations of the outer holding members. This makes it possible to compensate not only the elastic deformations of the two outer holding members (13,14), but all back rest components involved in the transmission of forces. Consequently, reproducible centered chucking of the workpiece (2) can be accomplished at all times with great chucking accuracy.

11 Claims, 3 Drawing Sheets

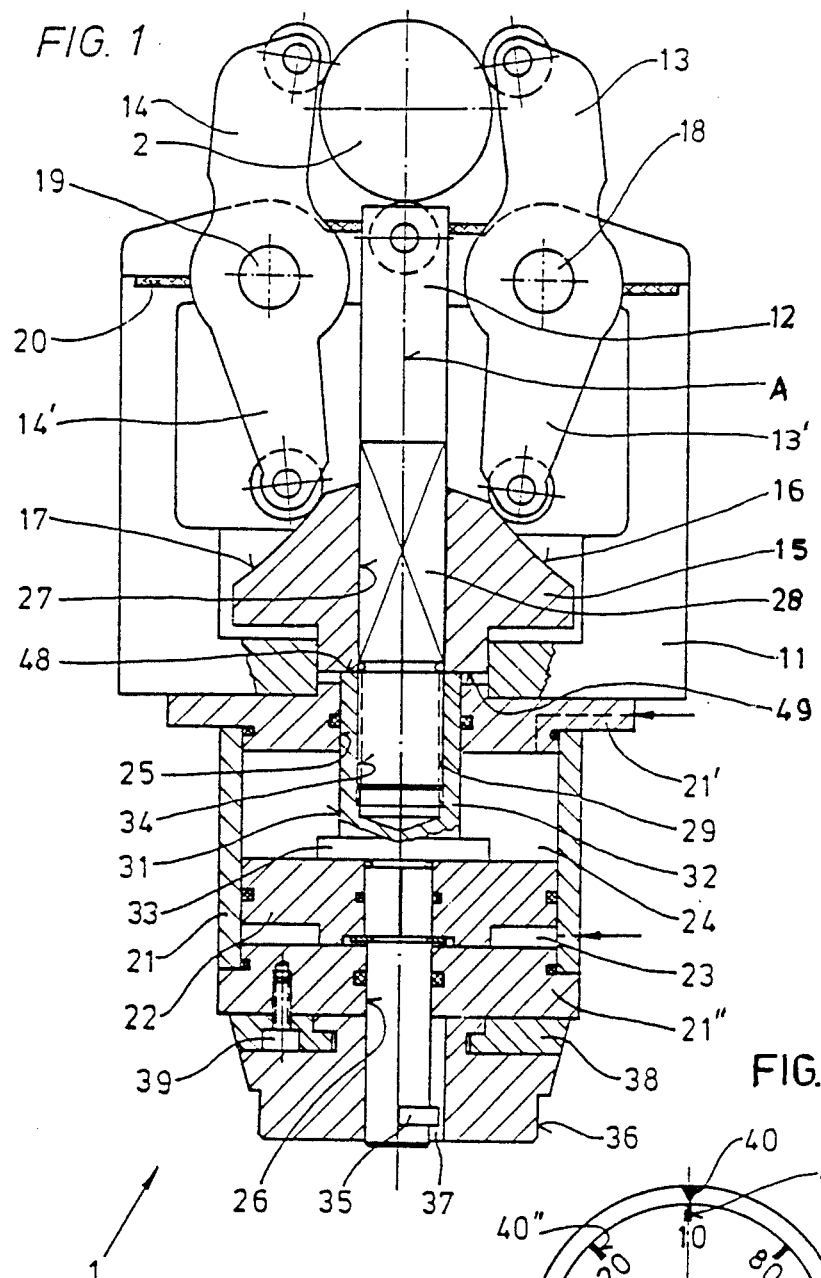
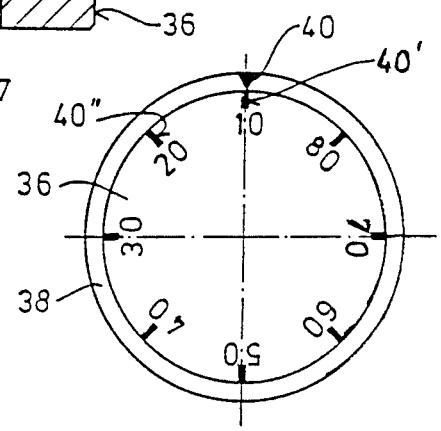
FIG. 1
FIG. 2

SELF-CENTERING STEADY REST FOR LATHE

FIELD AND BACKGROUND OF THE INVENTION

The present invention relates in general to steady rests for chucking and/or hold rod-shaped workpieces of circular diameter in a lathe, and in particular to a new and useful steady rest with three holding members disposed in a common plane, their respective points of contact being equidistant from the workpiece axis, with two of the holding members designed as pivoted angular levers disposed in mirror image relative to each other, and there being inserted between them a third holding member which is rectilinearly movable in a direction towards the workpiece axis by an actuating piston which can be acted upon by a pressure medium. The third holding member supports an adjusting member in the form of a vee or wedge provided with control surfaces and interacting with the free ends of the angular levers. A device is also provided for the compensation of the elastic deformations of the holding members.

A self-centering steady rest of this kind is known from German Pat. No. 33 14 483. In order to prevent a displacement of the workpiece under different chucking pressures, this steady rest has, for the compensation of the deflection of the outer holding members, an elastically resilient part installed in the central holding member. This elastically resilient part is in the form of an axially deformable rod or a belleville washer with largely linear deformation characteristics whose change in length equals the deflection. However, this embodiment of a device for the compensation of the elastic deformation of the holding members is not practical because the central holding member equipped with the elastically resilient part is no longer rigid, thus making vibrations having an adverse effect on the machining of the workpiece unavoidable and, because the actual deformation of the elastically resilient part is not definable. Consequently, the elastic deformation of the holding members can be influenced only inadequately, if at all, with this device which also is not adjustable.

SUMMARY OF THE INVENTION

It is therefore an object of the invention to create, for a self-centering steady rest of the above kind, a device for the compensation of the elastic deormations of the two outer holding members and also of the steady rest components participating in the transmission of forces by these holding members. This device is not only simple in design and easy to handle, but is also capable, within a short time and without the occurrence of technical difficulties, of compensating for a workpiece displacement due to the deformations of the outer holding members and of all components interacting with them. In addition, a chucking accuracy should be reproducible for the respective chucking pressures, with extremely simple adjustability.

According to the invention, this is accomplished in that, for the compensation of the elastic deformations of the two outer holding members and the other back rest components, participating in their transmission of forces, the adjusting member is disposed relative to the central holding member so as to be adjustable thereon. The holding member is adjustable under load in its longitudinal direction, by an adjusting distance corresponding to the respective sum of the deformations relative to the central holding member.

In a simple embodiment this can be accomplished so that the central holding member is movably guided in a manner secured against rotation, e.g. by means of the adjusting member, and connected via a thread, a ball screw or a similar transmission means, to a control member which is movable by the actuating piston and turnable by means of an actuator.

It is expedient in this connection to have the control member formed by a stepped and/or flanged rod which supports, preferably in the center, the actuating piston and at whose one end the central holding member is adjustable by means of a thread and at whose other end the actuator is attached.

The actuator may be formed in a simple manner by a handwheel or a lever joined in a manner that is secure against rotation, to the control member and coordinated with pressure controlled position indicator provided on the cylinder accommodating the actuating piston. It is also possible, however, to provide a step motor for this purpose, which is equipped with a pulse generator and whose rotary motions are determinable by means of a pulse counter, and storable in a computer.

According to a different embodiment there may be coordinated with the central holding member, for the adjustment of the travel distance, a stop which is axially movable and settable relative to the actuator and expediently formed of a rod and adjustably retained on the actuating piston by means of a thread.

In a steady rest for two chucking pressures of different magnitude, it is further advisable to install, in the cylinder of the actuating piston, another piston assigned to the high chucking pressure and rigidly connected to the adjustment of the adjusting member relative to the central holding member.

When designed in accordance with the invention, the device for the compensation of the elastic deformation of the outer holding members and of the other steady rest components, participating in the structures for the transmission of forces, is simple in its construction and therefore also economically producible, but above all easy to handle while making certain that a compensation of any elastic deformation can be accomplished in short order and extremely accurately. If the adjusting member is arranged so as to be adjustable relative to the central holding member by an adjustable distance as in the invention, and thus distance being defined, for adjustment under load, it is easily possible to compensate a workpiece displacement occurring under high chucking forces by changing the position of the central holding member. All this requires, for instance, is to turn a handwheel to retract the central hold member until the chucked workpiece is moved to its centered position. If, in this handwheel position, its pressure dependent rotary motion is marked, or if the corresponding rotary motion of a step motor is stored, the same sized workpiece is always chucked in its centered position when chucking operations are repeated.

The structural cost required to accomplish this is low because only few components require changing in prior machines. Nor is the size of the steady rest affected adversely, but it is of special advantage that an individual compensation of all deformations can be made in every steady rest with extremely easy handling so that the elasticity of the different materials can likewise be compensated. Some embodiments of the inventive device for the compensation of the elastic deformations of the two outer holding members and of the other steady rest components, participating in their transmission of forces are depicted in the drawings. These devices are particularly applicable to a self-centering steady rest.

A further object of the present invention is to provide a steady rest for retaining a workpiece of circular diameter and with a central axis, on a lathe, comprising a housing, a pair of mirror symmetrical outer holding members each pivotally mounted to the housing, each outer holding member having a contact end for contacting the diameter of the workpiece at a contact point, and an opposite free end, a central holding member having a longitudinal axis and mounted for movement along the axis to the housing between the outer holding members, a central holding member having contact end for contacting the diameter of the workpiece at a contact point, all the contact points being co-planar and being equally spaced around the diameter of the workpiece when the workpiece is being held by the holding members, an actuating piston operatively connected to the central holding member for moving it along its axis, an adjusting member mounted for axial movement to the central holding member, the adjusting member having surfaces engaged with the free end of the outer holding members so that all of the holding members move into engagement with a workpiece when the adjusting member and central holding member are moved along the longitudinal axis, dual pressure means operatively connected to the actuating piston for applying a contact pressure to the piston to move the contact members to contact a workpiece, and for applying a holding pressure to the actuating piston for moving the outer holding members into chucking engagement with the workpiece, which holding pressure tends to elastically deform the outer holding members and structures holding the outer holding members, and an actuator operatively connected between the central holding member and the adjusting member for adjusting the relative position therebetween when the holding pressure is applied to center the workpiece.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is an axial sectional view of a steady rest in which the adjusting member is axially adjustable by a thread relative to a central holding member by means of a handwheel;

FIG. 2 is a plan view of a position indicator of the adjusting member for different chucking pressures in the steady rest according to FIG. 1;

DESCRIPTION OF THE PREFERRED EMBODIMENTS

Figure 3:
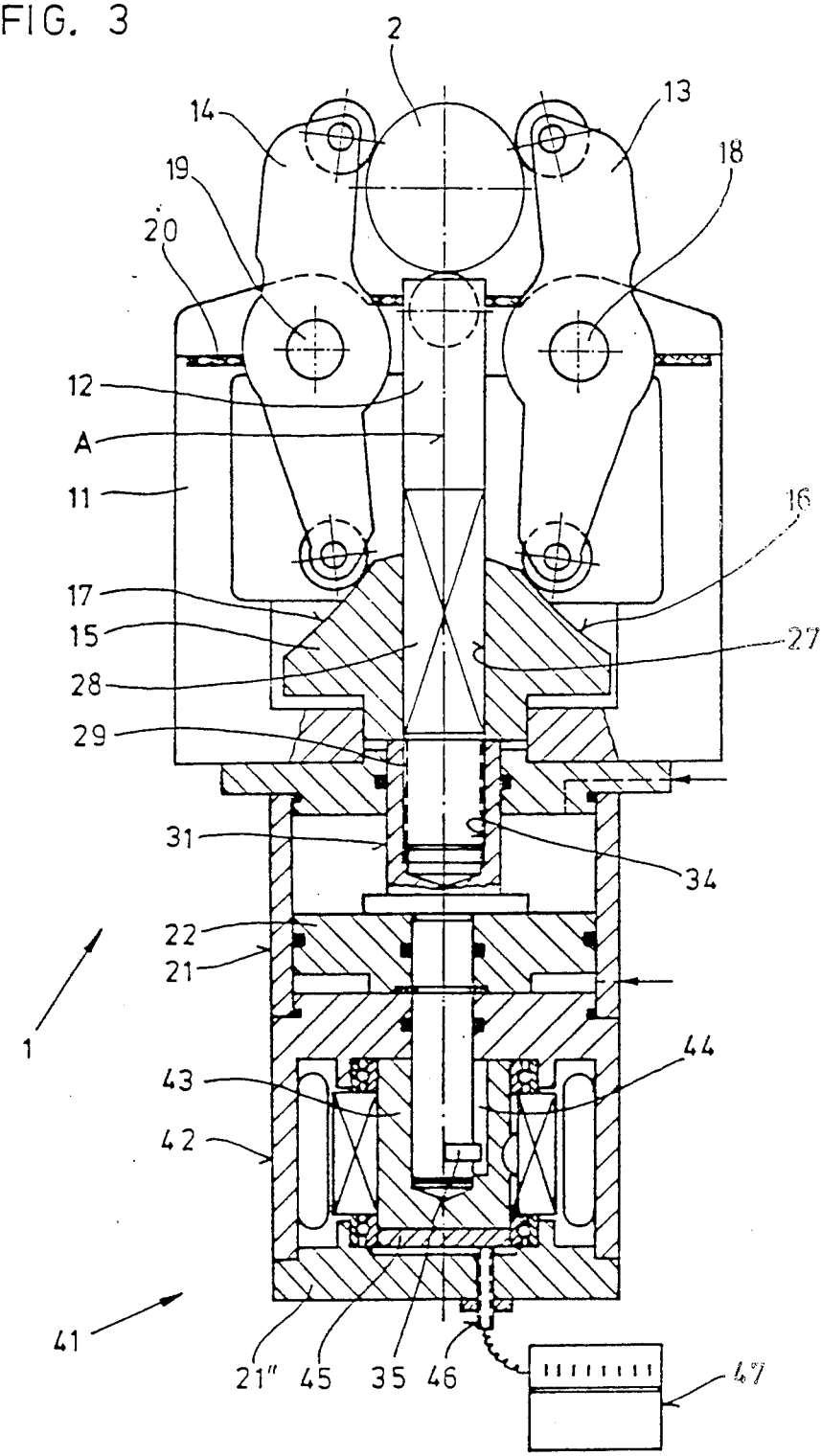
FIG. 3 is a view similar to FIG. 1 of a steady rest with a step motor as actuator.

The self-centering steady rest shown in FIGS. 1 and 3 designated 1 in each, serves for the chucking and/or holding of rod-shaped workpieces 2 and comprises three holding members 12, 13 and 14 installed in a housing 11 and disposed in one common plane, the two outer holding members 13 and 14 being designed as angular levers disposed in mirror image to each other and pivoted about pivot pins 18 and 19. The holding member 12, which is adjustable in the direction towards the axis of the workpiece 2, is here provided with an adjusting member 15 in the form of a vee or wedge provided with control surfaces 16 and 17 that interact with the free ends 13' and 14' of the holding members 13 and 14. The housing 11, shown without cover, is sealed on the side facing the workpiece 2 by means of a gasket 20.

An actuating piston 22 installed in a cylinder 21 flanged to the housing 11 serves for the actuation of the holding members 12, 13 and 14. If pressure medium is fed to the pressure chamber 23 in the operating position according to FIG. 1, the actuating piston 22, the central holding member 12 connected to it and the adjusting member 15 are pushed upwardly so that the two outer holding members 13 and 14 are pressed against the inserted workpiece 2, chucking it in the steady rest 1. On the other hand, if pressure medium is fed to the pressure changer 24, the steady rest 1 is opened and the workpiece 2 can be removed.

A high chucking forces, in order to be able to compensate for the elastic deformations of the outer holding members 13 and 14 and of the other components of the steady rest 1 participating in their transmission of forces, special measures have been taken to guarantee that a compensation of the deformations can be made in simple manner. This can be accomplished in that the adjusting member 15 is adjustable relative to the central holding member 12 under load in the longitudinal direction A of the member 12, by an adjustable distance corresponding to the respective sum of the deformations of the outer holding members 13 and 14 and of the other components of the steady rest 1 participating in their transmission of forces.

This purpose is served in the steady rest 1 according to FIGS. 1 and 3 by a rotatable control member 31 in the form of a rod 32 which has at one end a tapped hole 34 into which is screwed the thread 29 of the central holding member 12, and to whose other end an actuator 36 is connected secure against rotation. The control member 31 penetrates the holes 25 and 26 drilled into the cylinder covers 21' and 21", and at its face 48 facing the adjusting member 15, the member 31 is in contact with the surface 49 of the adjusting member 15. In addition, a flange 33 supporting the actuating piston 22 is formed on the control member 31. By means of a key 35 axially guided in a keyway 37 machined into the actuator 36, the control member 31 is coupled to the actuator 36 secure against rotation but axially movable thereon.

By turning the actuator 36 the central holding member 12 and the adjusting member 15 are moved relative to each other in the direction of the longitudinal axis A. For this purpose, the central holding member 12 is guided secure against rotation in a recess 27 of the adjusting member 15 by means of a rectangular guide part 28.

If the workpiece 2 is to be chucked between the holding members 12, 13 and 14 with a high chucking force, it will be chucked eccentrically unless special measures are taken to compensate the deformations of the two outer holding members 13 and 14 and of the other components involved in the transmission of forces, such as the pivot pins 18,19, the housing 11 that holds the pins, the adjusting member 15, the contact rollers on the member 13,14, and the pins supporting the rollers, because due to the bending stress their deformations are greater than the deformation of the central holding member 12 which is stressed in compression only. This would cause the outer holding members 13 and 14 to be bent open, and the central holding member 12 would push the workpiece 2 more or less out of center of the steady rest 1. But if the adjusting member 15, at a high chucking force acting upon the workpiece 2, is advanced relative to the position, it assumes at a lower chucking force where centered chucking is given, so that the outer holding member 13 and 14 perform a greater feed motion, the displacement of the workpiece 2 can be compensated.

This is accomplished in the embodiment according to FIG. 1 in that the holding member 12 is screwed by means of its thread 29 into the tapped hole 34 by turning the actuator 36 and the control member 31. In so doing, the adjusting member 15 is advanced by this distance in relation to the holding member 12 because its surface 49 is supported by the contact surface 48.

In practical application, the adjustment for a workpiece will be made so that the workpiece 2 is chucked first with a chucking force or contact pressure which causes no elastic deformation of the outer holding members 13 and 14 as well as of the other components. As shown in FIG. 2, a mark 40' is set on the actuator 36 for this operating state, which mark 40' is flush or even with a mark 40 on a disc 38 firmly fastened by screws 39 to the cylinder cover 21". Then the pressure of the pressure medium in the pressure chamber 23 is increased to a higher holding pressure so that a specified higher chucking force is obtained. Now that the two outer holding members 13 and 14 are bent open and other deformations occur, the workpiece 2 assumes an eccentric position. If the actuator 36 and the control member 31 rigidly joined to it via the key 35 are turned so that the holding member 12 moves back, the workpiece 2 is returned to the center of the back rest 1. When the workpiece 2, by advancing the adjusting member 15 relative to the central holding member 12 by a defined distance corresponding to the elastic deformations, is chucked so as to be centered, another mark, such as the mark 40", is set which is flush or even with the mark 40. In the embodiment of FIGS. 1 to 3, the dual pressure means for applying two different pressures is symbolized by the arrow and line into chamber 23.

Accordingly, when a new workpiece, preferably of the same diameter, is chucked with the same holding pressure or chucking force, the actuator 36 need only be turned before the chucking operation so that its mark 40" corresponds to the mark 40 on the disc 38. A centered chucking is assured in this case because the elastic deformation of the two outer holding members 13 and 14 as well as of the other components of the steady rest 1 participating in the transmission of forces is compensated.

In the embodiment example according to FIG. 3 an electric step motor 42 is provided as actuator 41 which is mounted to the cylinder 21 whose hub 43 is engaged by the control member 31. The control member 31, while movable axially, is retained secure against rotation in the keyway 44 of the hub 43 by means of the key 35.

To make an adjustment there is installed in the cylinder cover 21" a pulse generator 46 which interacts with a step counter 45 (e.g. a marked disc) as pulse generator mounted to the face of the hub 43 and connected to a computer 47. The rotation of the control member 31, and hence the retraction or adjustment of the adjusting member 15, appropriate for the specified chucking pressure, can be accomplished in short order prior to the start of a chucking operation by means of the step motor 42 which is also used to turn the control member 31 for the compensation of the workpiece displacement during the setup. Accordingly, an automatic compensation of the elastic deformation of the outer holding members 13 and 14 can be made without problems with the embodiment shown in FIG. 3.

Figure 4:
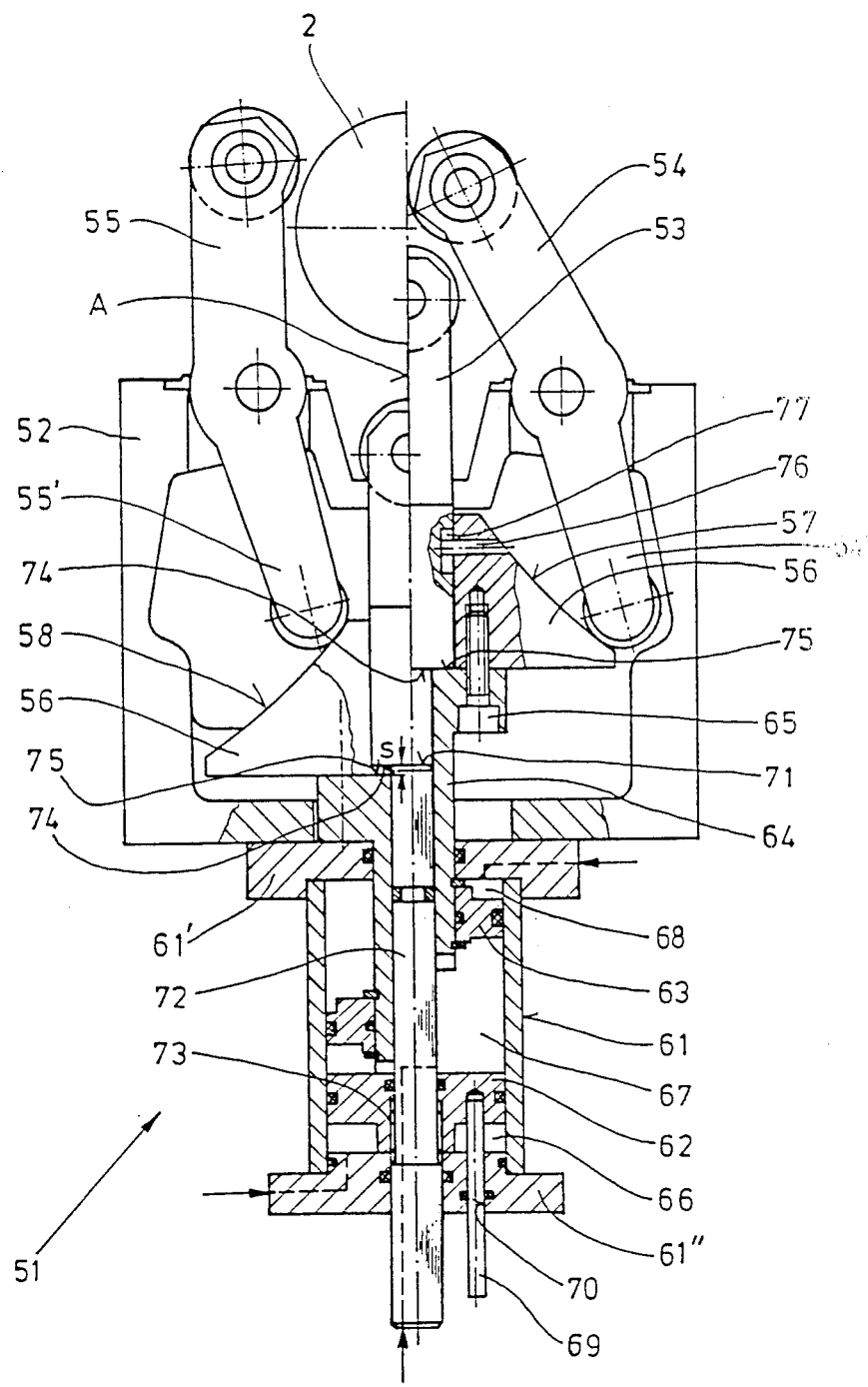
FIG. 4 is a view similar to FIG. 1 of a steady rest equipped with two actuating pistons and an axially movable stop to set the position change between the adjusting member and the central holding member.

The self-centering steady rest 51 shown in FIG. 4 includes an adjusting member 56 that is mounted for motion in the axial direction A of the central holding member 53 and on the central holding member for motion by travel distance s that is set so that the position of the adjusting member 56 can be changed relative to the central holding member 53 to compensate for an eccentric displacement of the workpiece 2 when chucked with a high chucking force. In this embodiment too, the outer holding members 54 and 55, installed in a housing 52 so as to be pivotable, are pivoted by the adjusting member 56 because their ends 54' and 55' interact with the control surfaces 57 and 58, respectively.

A stop 71 is formed by a rod 72 fastened to the actuating piston 62 installed in a flanged-on cylinder 61. By means of a thread 73 the rod 72 is adjustably connected to the actuating piston 62 which is secured against rotation by a pin 69 movably guided in a hole 70 drilled into the cylinder cover 61".

In this embodiment there is installed in the cylinder 61 another piston 63 whose piston rod 64 penetrates the cylinder cover 61' and is fastened to the adjusting member 56 by means of screws 65.

When chucking a workpiece 2 with little chucking force, e.g. to perform finishing operations, pressure medium is fed to the pressure chamber 66. This causes both actuating pistons 62 and 63, and hence the central holding member 53 and the adjusting member 56, to move in the direction of the workpiece 2. As the left half of FIG. 4 shows, the position assumed by the adjusting member 56 is such that the contact surface 75 of the piston rod 64 does not rest against the countersurface 74 of the central holding member 53, the surfaces 74 and 75 are much rather mutually offset by the distance s. This is accomplished by means of the stop 71 against which the contact surface 74 of the central holding member 53 supports itself.

If, on the other hand, pressure medium of high pressure is supplied to the pressure chamber 67, the actuating piston 63 is moved in the direction towards the workpiece 2. This causes its piston rod 64 to take along the central holding member 53 because the surface 75 of the piston rod 64 contacts the surface 74 of the central holding member 53 (FIG. 4, right half), although offset by the distance S which corresponds to the compensation of the elastic deformation of the two holding members 54 and 55 as well as the other components of the steady rest 51 participating in their transmission of forces. Accordingly, also when chucking with great chucking force, e.g. to perform roughing operations, no deflection of the workpiece 2 need be tolerated. By feeding pressure medium into the pressure chamber 68 the rest 51 can be opened and the workpiece 2 removed. The central holding member 53 is taken along during a retraction due to a safety pin 76 inserted in the adjusting member 56 and engaging a longitudinal slot 77 machined into the central holding member 53 While specific embodiments of the invention have been shown and described in detail to illustrate the application of the principles of the invention, it will be understood that the invention may be embodied otherwise without departing from such principles.

What is claimed is:

1. A steady rest for retaining a workpiece of a circular diameter and with a central axis, on a lathe, comprising:
    a housing;
    a pair of mirror symmetrical outer holding members each pivotally mounted by pivot mounting to said housing, each outer holding member having a contact end for contacting the diameter of a workpiece at a contact point, and a free end, said outer holding members, said pivot mountings and said housing undergoing an elastic deformation when said contact ends of said outer holding members are pressed against a workpiece by a chucking force;
    a central holding member having a longitudinal axis and mounted for linear motion to said housing between said outer holding members, said central holding member having a contact end for contacting the diameter of a workpiece at a contact point, said contact points of said holding members all being co-planar and being equally spaced around the diameter of a workpiece held by said holding members;
    an actuating piston operatively connected to said central holding member for moving said central holding member along its longitudinal axis toward a workpiece;
    an adjustment member operatively connected to said central holding member and movable along said longitudinal axis by said actuating piston, said adjusting member being movable relative to said central holding member along said longitudinal axis; and
    actuator means connected to said central holding member for moving said central holding member along said longitudinal axis relative to said adjusting member by an amount corresponding to the elastic deformation of said outer holding members, said pivot mountings and said housing which are a result of applying the chucking force on said actuating member by said actuating piston.

2. A steady rest according to claim 1, wherein said central holding member is non-rotatably mounted to said housing, said actuator means comprising a control member rotatably mounted to said housing and thread means operatively connected between said control member and said central holding member for moving said central holding member axially with rotation of said control member, said actuator means including an actuator connected to said housing and having a rotatable part connected to said control member, said actuator rotating said rotatable part by a selected amount corresponding to the amount of axial movement of said central holding member necessary to correspond to the elastic deformation.

3. A steady rest according to claim 1, wherein said actuator means comprises a stop axially movable on said housing and engageable with said central holding member for moving said central holding member by a selected axial amount corresponding to the elastic deformation.

4. A steady rest according to claim 1, wherein said adjusting member (15, 56) is positionable relative to said central holding member (12, 53) at an adjustable distance (S) along said longitudinal axis thereof (A) corresponding to the sum of the deformation occurring under load and in dependence on the crafting of the outer restraining elements.

5. A steady rest for retaining a workpiece of a circular diameter and with a central axis, on a lathe, comprising:
    a housing;
    a pair of mirror symmetrical outer holding members each pivotally mounted by pivot mountings to said housing; each outer holding member having a contact end for contacting the diameter of a workpiece at a contact point, and a free end, said outer holding members, said pivot mountings and said housing undergoing an elastic deformation when said contact ends of said outer holding members are pressed against a workpiece by a chucking force;
    a central holding member having a longitudinal axis and mounted for linear motion to said housing between said outer holding members, said central holding member having a contact end for contacting the diameter of a workpiece at a contact point, said contact points of said holding members all being co-planar and being equally spaced around the diameter of a workpiece held by said holding members;
    an actuating piston operatively connected to said central holding member for moving said central holding member along its longitudinal axis toward a workpiece;
    an adjustment member operatively connected to said central holding member and movable along said longitudinal axis by said actuating piston, said adjusting member being movable relative to said central holding member along said longitudinal axis; and
    actuator means connected to said central holding member for moving said central holding member along said longitudinal axis relative to said adjusting member by an amount corresponding to the elastic deformation of said outer holding members, said pivot mounting and said housing which are a result of applying the chucking force on said actuating member by said actuating piston, said central holding member being non-rotatably mounted to said housing, said actuator means comprising a control member rotatably mounted to said housing and thread means operatively connected between said control member and said central holding member for moving said central holding member axially with rotation of said control member, said actuator means including an actuator connected to said housing and having a rotatable part connected to said control member, said actuator rotating said rotatable part by a selected amount corresponding to the amount of axial movement of said central holding member necessary to correspond to the elastic deformation, said control members comprising a rod with a step, said rod being slidably mounted parallel to said longitudinal axis on said actuating piston and said step being engageable with said actuating piston for transmitting linear movements of said actuating piston to linear movements of said central holding member and said adjusting member.

6. A steady rest according to claim 5, wherein said thread means comprises said central holding member having a threaded end and said rod having a threaded bore to which said threaded end of said central holding member is threadably engaged.

7. A steady rest according to claim 6, wherein said actuator comprises a hand wheel rotatably mounted to said housing and co-rotatably connected to said rod, said rod being axially movable with respect to said hand wheel, said hand wheel including at least one marking and said housing including at least one marking, the relative position between said markings comprising an indication of the rotational position of said hand wheel and thus the relative axial position between said central holding member and said adjusting member.

8. A steady rest according to claim 6, wherein said actuator comprises a step motor, pulse generator means connected to said step motor for generating pulses corresponding to the rotation of said rotatable part, and a computer connected to said pulse generator means for counting and storing said pulses to store data corresponding to the rotational position of said rotatable part.

9. A steady rest for retaining a workpiece of a circular diameter and with a central axis, on a lathe, comprising:
a housing;
a pair of mirror symmetrical outer holding members each pivotally mounted by pivot mountings to said housing, each outer holding member having a contact end for contacting the diameter of a workpiece at a contact point, and a free end, said outer holding members, said pivot mountings and said housing undergoing an elastic deformation when said contact ends of said outer holding members are pressed against a workpiece by a chucking force;
a central holding member having a longitudinal axis and mounted for linear motion to said housing between said outer holding members, said central holding member having a contact end for contacting the diameter of a workpiece at a contact point, said contact points of said holding members all being co-planar and being axially spaced around the diameter of a workpiece held by said holding members;
an actuating piston operatively connected to said central holding member and movable along said longitudinal axis by said actuating piston, said adjusting member being movable relative to said central holding member along said longitudinal axis; and
actuator means connected to said central holding member for moving said central holding member along said longitudinal axis relative to said adjusting member by an amount corresponding to the elastic deformation of said outer holding members, said pivot mounting and said housing which are a result of applying the chucking force on said actuating member by said actuating piston, said actuator means comprising a stop axially movable on said housing and engageable with said central holding member for moving said central holding member by a selected axial amount corresponding to the elastic deformation, and a rod mounted for axial movement to said housing and carrying said stop, said rod being mounted to said actuating piston at an axially adjustable location thereon.

10. A steady rest according to claim 9, including a cylinder connected to said housing and having a space in which said actuating piston is axially movable, a second actuating piston moveable in said space and fixed to said adjusting member, and dual pressure means connected to said cylinder for applying pressure to part of said space for moving said actuating and said additional pistons together, and for moving said additional pistons independently of said actuating piston.

11. A steady rest according to claim 9, wherein said piston is threadably connected to said rod so that relative rotation between said piston and said rod causes relative axial movement between said piston and said rod, and means connected between said actuating piston and said housing for permitting axial movement of said actuating piston while restraining rotation of said actuating piston.

* * * * *